United States Patent
Shen

(10) Patent No.: US 12,094,055 B2
(45) Date of Patent: Sep. 17, 2024

(54) METHOD FOR GENERATING DIGITAL DATA SET REPRESENTING TARGET TOOTH ARRANGEMENT FOR ORTHODONTIC TREATMENT

(71) Applicant: HANGZHOU CHOHOTECH CO., LTD., Hangzhou (CN)

(72) Inventor: Kaidi Shen, Hangzhou (CN)

(73) Assignee: HANGZHOU CHOHOTECH CO., LTD., Hangzhou (CN)

(*) Notice: Subject to any disclaimer, the term of this patent is extended or adjusted under 35 U.S.C. 154(b) by 158 days.

(21) Appl. No.: 18/011,511

(22) PCT Filed: Mar. 30, 2021

(86) PCT No.: PCT/CN2021/083968
§ 371 (c)(1),
(2) Date: Dec. 19, 2022

(87) PCT Pub. No.: WO2021/253917
PCT Pub. Date: Dec. 23, 2021

(65) Prior Publication Data
US 2023/0334771 A1   Oct. 19, 2023

(30) Foreign Application Priority Data
Jun. 19, 2020   (CN) .......................... 202010565918.6

(51) Int. Cl.
*G06T 17/00*   (2006.01)
*A61C 13/34*   (2006.01)
(52) U.S. Cl.
CPC .............. *G06T 17/00* (2013.01); *A61C 13/34* (2013.01)

(58) Field of Classification Search
CPC . G06T 19/20; G06T 17/00; G06T 2219/2021; G06T 2210/41; G06N 3/08; G06N 3/04; A61C 7/002; A61C 13/34
See application file for complete search history.

(56) References Cited

U.S. PATENT DOCUMENTS

| | | | |
|---|---|---|---|
| 6,463,344 B1* | 10/2002 | Pavloskaia | G16H 50/50 |
| | | | 700/118 |
| 2009/0098502 A1 | 4/2009 | Andreiko | |

(Continued)

FOREIGN PATENT DOCUMENTS

| | | |
|---|---|---|
| CN | 106618760 A | 5/2017 |
| CN | 109363786 A | 2/2019 |

(Continued)

*Primary Examiner* — Xilin Guo
(74) *Attorney, Agent, or Firm* — Birch, Stewart, Kolasch & Birch, LLP

(57) ABSTRACT

One aspect of the present application provides a method for generating a digital data set representing a target tooth arrangement for an orthodontic treatment, the method comprises: obtaining a first 3D digital model representing a jaw under an initial tooth arrangement; sampling on each tooth in the first 3D digital model to obtain a corresponding set of sampling points; generating a corresponding geometric code using a trained first deep artificial neural network, based on each of the sets of sampling points; combining the geometric codes of all teeth to obtain an overall geometric code of the jaw; and generating a digital data set representing the target tooth arrangement for the orthodontic treatment of the jaw using a trained second deep artificial neural network based on the overall geometric code of the jaw.

12 Claims, 2 Drawing Sheets

(56) References Cited

U.S. PATENT DOCUMENTS

| | | | | |
|---|---|---|---|---|
| 2014/0379356 | A1* | 12/2014 | Sachdeva | A61C 7/002 |
| | | | | 705/2 |
| 2017/0007364 | A1* | 1/2017 | Wu | A61C 7/08 |
| 2018/0189434 | A1* | 7/2018 | Zhou | G06F 30/23 |
| 2021/0321872 | A1* | 10/2021 | Saphier | G06T 17/20 |
| 2021/0322136 | A1* | 10/2021 | Anssari Moin | A61C 7/002 |

FOREIGN PATENT DOCUMENTS

| | | |
|---|---|---|
| CN | 109528323 A | 3/2019 |
| CN | 110473283 A | 11/2019 |
| CN | 111274666 A | 6/2020 |

\* cited by examiner

METHOD FOR GENERATING DIGITAL DATA SET REPRESENTING TARGET TOOTH ARRANGEMENT FOR ORTHODONTIC TREATMENT

FIELD OF THE APPLICATION

The present application generally relates to a method for generating a digital data set representing a target tooth arrangement for orthodontic treatment.

BACKGROUND

Nowadays, due to advantages on aesthetic appearance, convenience and hygiene etc., shell-shaped tooth repositioners made of polymer materials become more and more popular. A set of shell-shaped tooth repositioners usually includes a dozen even tens of successive shell-shaped tooth repositioners for incrementally repositioning a patient's teeth from an initial tooth arrangement to a target tooth arrangement, wherein there are N successive intermediate tooth arrangements, from a first intermediate tooth arrangement to a final intermediate tooth arrangement between the initial tooth arrangement and the target tooth arrangement.

A commonly used method for making shell-shaped tooth repositioners is respectively forming a series of successive shell-shaped tooth repositioners on a series of successive models of teeth, which respectively represent a series of successive tooth arrangements from the first intermediate tooth arrangement to the target tooth arrangement, using a thermoplastic forming process. A series of successive 3D digital models respectively representing a series of successive tooth arrangements from the first intermediate tooth arrangement to the target tooth arrangement may be used to control an apparatus to make these models of teeth. A commonly used method of obtaining these successive 3D digital models is first scanning to obtain a 3D digital model representing the patient's initial tooth arrangement (namely, the patient's tooth arrangement before the orthodontic treatment is performed), then manually manipulating the 3D digital model to obtain a 3D digital model representing the target tooth arrangement (namely, the tooth arrangement to be achieved by the orthodontic treatment), and then interpolating based on the two 3D digital models to obtain the series of successive intermediate 3D digital models.

It is laborious and time-consuming to manually manipulate the 3D digital model representing the patient's initial tooth arrangement to obtain the 3D digital model representing the target tooth arrangement, and the result is highly dependent on the operator's skills and knowledges, and it is difficult to ensure the consistency of the results. In view of the above, it is necessary to provide a computer-implemented method for generating a target tooth arrangement for an orthodontic treatment.

SUMMARY

One aspect of the present application provides a method for generating a digital data set representing a target tooth arrangement for an orthodontic treatment, the method includes: obtaining a first 3D digital model representing a jaw under an initial tooth arrangement; sampling on each tooth in the first 3D digital model to obtain a corresponding set of sampling points; generating a corresponding geometric code, using a trained first deep artificial neural network, based on each of the sets of sampling points; combining the geometric codes of all teeth to obtain an overall geometric code of the jaw; and generating the digital data set representing the target tooth arrangement for the orthodontic treatment of the jaw using a trained second deep artificial neural network based on the overall geometric code of the jaw.

In some embodiments, the first deep artificial neural network is a deep artificial neural network capable of processing point clouds.

In some embodiments, the first deep artificial neural network may be one of the following: PointNet network, PointNet++ network, PointCNN network and DGCNN network.

In some embodiments, the second deep artificial neural network may be a multi-layer perceptron-based regression network.

In some embodiments, the second deep artificial neural network may comprise an SE module configured to adaptively recalibrate channel-wise features in the current layer according to global information.

In some embodiments, the jaw may comprise an upper jaw and a corresponding lower jaw.

In some embodiments, the geometric code of each tooth is an M-dimensional vector, wherein a M'-dimensional vector is selected by the first deep artificial neural network during a training process, wherein M and M' are both natural numbers, and M>M'.

In some embodiments, the M-dimensional vector further includes information representing the pose of the corresponding tooth.

In some embodiments, the M'-dimensional vector represents the geometry of the corresponding tooth.

In some embodiments, in the encoding of geometric code of each tooth by the first deep artificial neural network, features extracted from each sampling point of the tooth comprise positional relationships between the sampling point and neighboring teeth.

In some embodiments, the feature relating to the positional relationships between the sampling point and neighboring teeth may be the shortest distances from the sampling point to the neighboring teeth respectively.

In some embodiments, the method of generating a digital data set representing a target tooth arrangement for orthodontic treatment may further comprise: performing at least one iteration based on the digital data set representing the target tooth arrangement to obtain an updated digital data set representing an updated target tooth arrangement.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

DETAILED DESCRIPTION OF ILLUSTRATED EMBODIMENTS

In the following detailed depictions, reference is made to the accompanying drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

One aspect of the present application provides a computer-implemented method for generating a digital data set representing a target tooth arrangement for an orthodontic treatment.

An orthodontic treatment is a process of repositioning teeth from an initial tooth arrangement to a target tooth arrangement. It is understood that the target tooth arrangement is a tooth arrangement to be achieved by the orthodontic treatment; the initial tooth arrangement may be the patient's tooth arrangement before the orthodontic treatment, or the patient's current tooth arrangement based on which the method of the present application is used to generate the target tooth arrangement.

Figure 1:
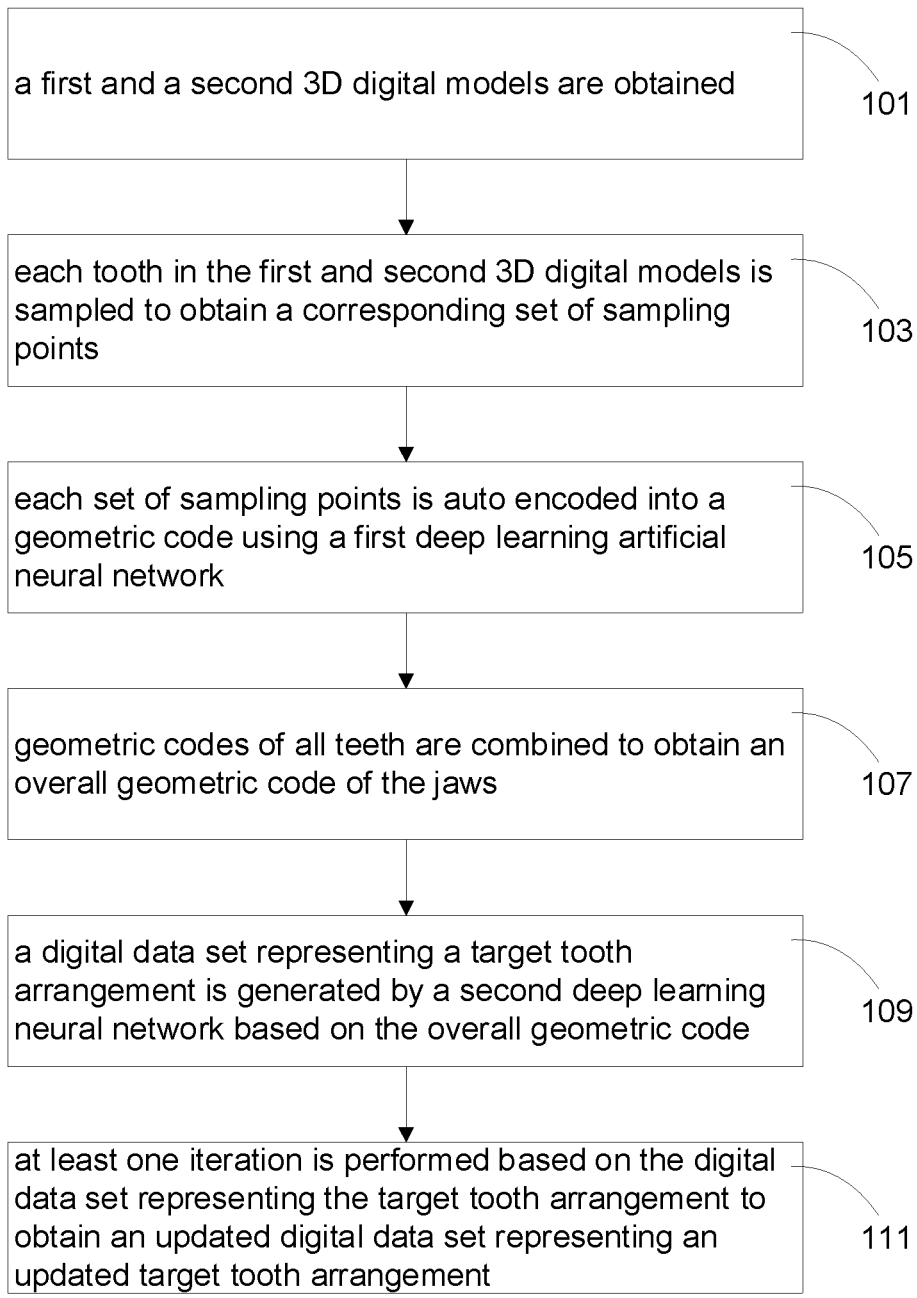
FIG. 1 schematically illustrates a flow chart of a computer-implemented method for generating a digital data set representing a target tooth arrangement for an orthodontic treatment according to one embodiment of the present application.

Referring to FIG. 1, it is a schematic flow chart of a computer-implemented method 100 for generating a target tooth arrangement for an orthodontic treatment according to one embodiment of the present application.

In one embodiment, the method for generating target tooth arrangement for orthodontic treatment according to the present application may be used to generate a target tooth arrangement of a single jaw (e.g., an upper jaw or a lower jaw); in another embodiment, the method for generating target tooth arrangement for orthodontic treatment according to the present application may process an upper jaw and a corresponding lower jaw as a whole, to generate a target tooth arrangement of the upper jaw and lower jaw. The method for generating target tooth arrangement for orthodontic treatment of the present application will be described in detail below in an example in which an upper and a corresponding lower jaw are processed as a whole.

In 101, a first 3D digital model and a second 3D digital model representing the patient's upper jaw teeth and lower jaw teeth under the initial tooth arrangement respectively are obtained.

In one embodiment, a 3D digital model representing teeth under an initial tooth arrangement may be obtained by directly scanning a patient's jaw(s). In another embodiment, a 3D digital model representing teeth under an initial tooth arrangement may be obtained by scanning a mockup, for example a plaster model, of a patient's jaw(s). In yet another embodiment, a 3D digital model representing teeth under an initial tooth arrangement may be obtained by scanning an impression of a patient's jaw(s).

In one embodiment, after a 3D digital model representing teeth under an initial tooth arrangement is obtained, the 3D digital model may be segmented so that the teeth in the 3D digital model are independent from one another, and each tooth in the 3D digital model may be moved individually.

In one embodiment, to simplify calculations, the first 3D digital model and second 3D digital model may be described using a global coordinate system and corresponding local coordinate systems i.e. each tooth has its own local coordinate system, and the pose of its local coordinate system in the global coordinate system represents the pose of the tooth.

In 103, each tooth in the first 3D digital model and second 3D digital model is sampled to obtain a corresponding set of sampling points.

In one embodiment, 3D digital model of each tooth may be evenly sampled. In one embodiment, farthest point sampling method may be used. Inspired by the present application, it is understood that the sampling method is not limited to the above-listed methods and it may be any other suitable sampling method.

In one embodiment, 1024 points may be obtained by sampling from vertices of 3D digital model of each tooth. Inspired by the present application, it is understood that the number of sampling points is not limited to 1024 as long as the number of sampling points is large enough and geometric features of the tooth can be kept.

After the samplings, a corresponding set of sampling points is obtained for each tooth in the first and second 3D digital model.

In 105, auto-encoding is performed using a trained first deep learning artificial neural network based on each of the sets of sampling points, to obtain a corresponding geometric code.

In one embodiment, the first deep learning artificial neural network may be any deep learning artificial neural network capable of processing point clouds, for example, PointNet network, PointNet++ network, PointCNN network, DGCNN network etc. PointNet network will be taken as an example for illustration in the following embodiments.

In one embodiment, sampling point set of each tooth is auto-encoded using the trained PointNet network to obtain a code c regarding the 3D geometry of the corresponding tooth, wherein c is a n-dimensional vector. In one embodiment, the value of n may be determined according to experimental results and the calculating capacity of a calculating system, for example, the value of n may be taken from a range of 100~300, for example, n may be set to 100.

In one embodiment, for each tooth, its code c, position information p and orientation information q may be combined to obtain its geometric code (c, p, q). In one embodiment, the position information p may be a 3D vector representing a displacement of the tooth with respect to the world coordinate system; the orientation information q may be a rotation (e.g., quaternion, Euler angle, rotation matrix, or rotation vector) representing the rotation of the tooth with respect to the world coordinate system. In one embodiment, p and q may be the position and orientation of the local coordinate system of the corresponding tooth in the global coordinate system.

In 107, geometric codes of all teeth are combined to obtain an overall geometric code of the jaws.

In a method for generating a target tooth arrangement for a single jaw, the overall geometric code is the overall geometric code of the single jaw. In a method for generating a target tooth arrangement for an upper jaw and a corresponding lower jaw which are processed as a whole, the overall geometric code is the overall geometric code of the upper jaw and the lower jaw.

In one embodiment, the overall geometric code of the jaw may be a $N*(n+7)$ 2D matrix, wherein N represents a total number of teeth (N is usually 28 for a method in which the upper jaw and the lower jaw are processed as a whole), and n is the number of dimensions of the geometric code of each tooth. In one embodiment, as for each tooth, the number of dimensions of p may be 3, and the number of dimensions of q may be 4.

In 109, a digital data set representing a target tooth arrangement is generated using a trained second deep learning artificial neural network, based on the overall geometric code of the jaws.

Figure 2:
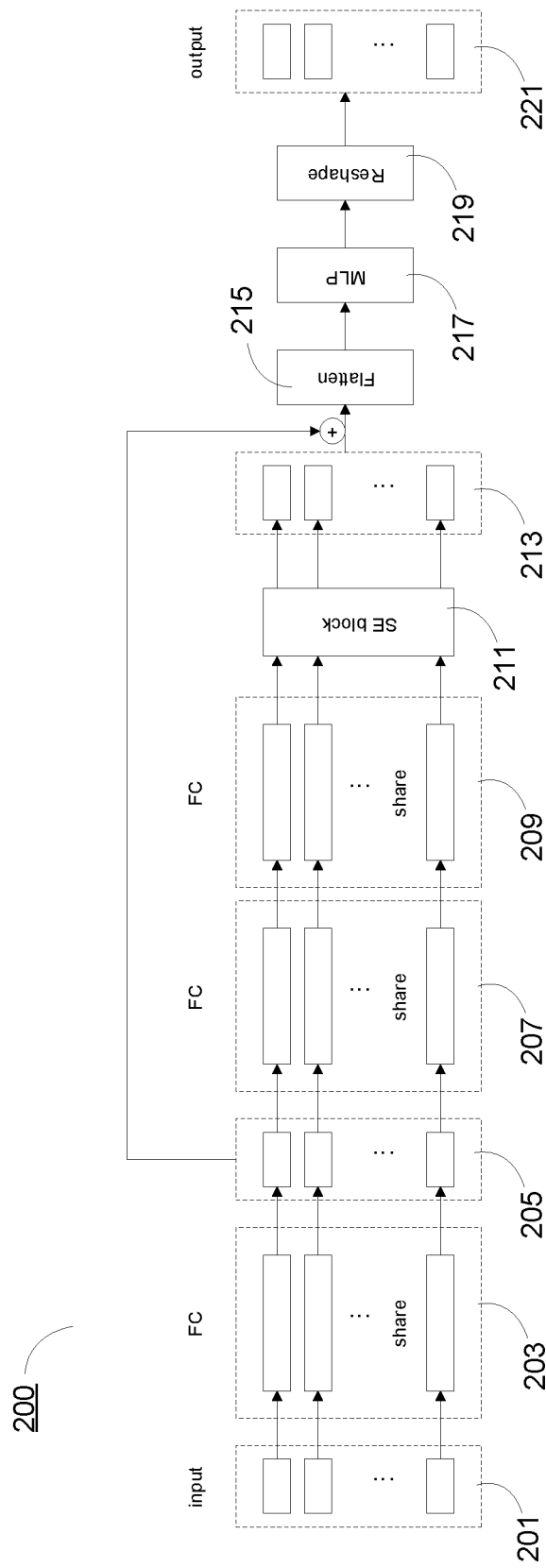
FIG. 2 schematically illustrates a second deep learning artificial neural network according to one embodiment of the present application.

Referring to FIG. 2, it schematically illustrates the second deep learning artificial neural network 200 according to one embodiment of the present application.

The second deep learning artificial neural network 200 may be considered as a multi-layer perceptron-based regression network i.e. for solving a regression problem based on multi-layer perceptron.

The second deep learning artificial neural network 200 includes an input module 201, a weight-sharing fully-connected layer module 203, a skip connection module 205, parameter-sharing fully-connected layer modules 207 and 209, an SE network (Squeeze-and-Excitation Network) module 211, an SE output module 213, a vector flattening module 215, a multi-layer perceptron module 217, a vector reconstruction module 219 and an output module 221.

The input module 201 receives the output of the first deep learning artificial neural network, e.g., a 2D matrix representing the overall geometric code of the jaws.

The SE network module 211 is used to adaptively recalibrate channel-wise features in the current layer according to global information, to emphasize useful features and suppress less useful features. Reference may be made to *Squeeze-and-Excitation Networks* published by Jie Hu, Li Shen and Gang Sun for the implementation of the SE network module 211.

The output of the skip connection module 205 and the output of the SE network module 211, after being combined, are input to the vector flattening module 215 for vector flattening to convert the data into a one-dimensional vector, so that the multi-layer perceptron module 217 connected to the vector flattening module 215 is able to receive and process these data. In one embodiment, the multi-layer perceptron module 217 may include several fully-connected layers.

The vector reconstruction module 219 reconstructs the one-dimensional vector output by the multi-layer perceptron module 217 to generate a matrix, which is then output by the output module 221.

In one embodiment, the second deep learning artificial neural network 200 may output a digital data set representing the poses of the teeth under the target tooth arrangement e.g. coordinates and angles of the teeth under the target tooth arrangement. In yet another embodiment, the second deep learning artificial neural network 200 may also output a spatial transformation matrix, which is used to move the teeth under the current tooth arrangement to the poses under the target tooth arrangement.

In one embodiment, the first deep learning artificial neural network and the second deep learning artificial neural network may be trained as a whole. For each tooth, what the n-dimensional feature in the geometric code represents is determined by the first deep learning artificial neural network during training, so that the n-dimensional feature can capture the influence of the geometric feature of the tooth on teeth aligning as accurately as possible, thereby guiding the network to align teeth more accurately.

In yet another embodiment, the first deep learning artificial neural network and the second deep learning artificial neural network may also be trained separately.

In one embodiment, the first deep learning artificial neural network may be a PointNet network, which may be trained using sampling point sets (as input) and reconstructed point sets (as output) with chamfer distances between sampling point sets and corresponding reconstructed point sets as a loss function.

In one embodiment, when geometric encoding is performed on each tooth using the first deep learning artificial neural network, the coordinates of the sampling points on the tooth may be coordinate values in the global coordinate system.

In one embodiment, when geometric encoding is performed on each tooth using the first deep learning artificial neural network, for each sampling point, the extracted features may include pose information, normal information, and the shortest distance between the sampling point and each neighboring tooth. After a large number of experiments, the Inventors of the present application discover that the feature the shortest distance between a sampling point and each neighboring tooth greatly helps to improve the precision of the generated target tooth arrangement. Inspired by the present application, it is understood that the feature may be replaced with other features representing positional relationships with neighboring teeth, for example, the farthest distance between the sampling point and a neighboring tooth, or an average distance between the sampling point and a neighboring tooth. The geometric code of each tooth is obtained based on the features extracted from the set of sampling points of the tooth.

In a further embodiment, when geometric encoding is performed on each tooth using the first deep learning artificial neural network, the coordinates of the sampling points on the tooth may be the coordinate values in the local coordinate system.

In the above embodiments, the upper jaw and lower jaw may be taken as a whole when using the method of the present application to generate the digital data set representing the target tooth arrangement. In this case, for each sampling point, when the feature the shortest distance between it and each neighboring tooth is extracted, not only the neighboring teeth in the jaw where the sampling point lies but also the neighboring teeth in the opposite jaw will be considered.

In a further embodiment, a digital data set representing a target tooth arrangement may be generated for a single jaw using the method of the present application e.g. only for an upper jaw or a lower jaw.

In 111, at least one iteration is performed based on the obtained digital data set representing the target tooth arrangement, to obtain an updated digital data set representing an updated target tooth arrangement.

In one embodiment, the above operations may be repeated at least once based on the obtained 3D digital model of the jaw representing the target tooth arrangement, to obtain an updated digital data set representing an updated target tooth arrangement.

After extensive experiments, the Inventors of the present application discover that usually the result obtained from one iteration is already good enough.

During the training phase, the operation may be taken as an enrichment to the existing data for training.

In one embodiment, the second deep learning artificial neural network may also be a deep learning Convolutional Neural Network (CNN for short).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Likewise, the various diagrams may depict an example architecture or other configuration for the disclosed method and system, which is done to aid in understanding the features and functionality that can be included in the disclosed method and system. The claimed invention is not restricted to the illustrated example architectures or configurations, but the desired features can be implemented using a variety of alternative architectures and configurations. Additionally, with regard to flow diagrams, operational descriptions and method claims, the order in which the blocks are presented herein shall not mandate that various embodiments be implemented to perform the recited functionality in the same order unless the context dictates otherwise.

Unless the context dictates, terms used herein are generally intended as "open" terms instead of limiting. The use of phrases such as "one or more", "at least" and "but not limited to" should not be construed to imply that the parts of the present application that do not use similar phrases intend to be limiting.

What is claimed is:

1. A method for generating a digital data set representing a target tooth arrangement for an orthodontic treatment, comprising:
    obtaining a first 3D digital model representing a jaw under an initial tooth arrangement;
    sampling on each tooth in the first 3D digital model to obtain a corresponding set of sampling points;
    generating a corresponding geometric code using a trained first deep artificial neural network, based on each of the sets of sampling points;
    combining the geometric codes of all teeth to obtain an overall geometric code of the jaw; and
    generating a digital data set representing the target tooth arrangement for the orthodontic treatment of the jaw using a trained second deep artificial neural network based on the overall geometric code of the jaw.

2. The method of claim 1, wherein the first deep artificial neural network is a deep artificial neural network capable of processing point clouds.

3. The method of claim 2, wherein the first deep artificial neural network is one of the following: PointNet network, PointNet++ network, and PointCNN network.

4. The method of claim 1, wherein the second deep artificial neural network is a multi-layer perceptron-based regression network.

5. The method of claim 4, wherein the second deep artificial neural network comprises an Squeeze-and-Excitation module configured to adaptively recalibrate channel-wise features in the current layer according to global information.

6. The method of claim 1, wherein the jaw comprises an upper jaw and a corresponding lower jaw.

7. The method of claim 1, wherein the geometric code of each tooth is an M-dimensional vector, of which a M'-dimensional vector is selected by the first deep artificial neural network during a training process, where M and M' are both natural numbers, and M>M'.

8. The method of claim 7, wherein the M-dimensional vector further comprise information representing the pose of a corresponding tooth.

9. The method of claim 7, wherein the M'-dimensional vector represents the geometry of a corresponding tooth.

10. The method of claim 1, wherein in the encoding of geometric code of each tooth by the first deep artificial neural network, features extracted from each sampling point of the tooth comprise positional relationships between the sampling point and neighboring teeth.

11. The method of claim 10, wherein the feature relating to the positional relationships between the sampling point and neighboring teeth may be the shortest distances from the sampling point to the neighboring teeth.

12. The method of claim 1, further comprising: performing at least one iteration based on the digital data set representing the target tooth arrangement to obtain an updated digital data set representing an updated target tooth arrangement.

* * * * *